US009530057B2

(12) United States Patent
Conner et al.

(10) Patent No.: US 9,530,057 B2
(45) Date of Patent: Dec. 27, 2016

(54) MAINTENANCE ASSISTANT SYSTEM

(71) Applicant: HONEYWELL INTERNATIONAL INC., Morristown, NJ (US)

(72) Inventors: Kevin J Conner, Kent, WA (US); Santosh Mathan, Seattle, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 447 days.

(21) Appl. No.: 14/090,106

(22) Filed: Nov. 26, 2013

(65) Prior Publication Data

US 2015/0146008 A1 May 28, 2015

(51) Int. Cl.

*G06K 9/00* (2006.01)
*G06F 3/03* (2006.01)
*G09B 9/00* (2006.01)
*G06Q 10/00* (2012.01)
*G06K 9/32* (2006.01)
*G06F 3/01* (2006.01)

(52) U.S. Cl.

CPC ......... *G06K 9/00671* (2013.01); *G06F 3/0304* (2013.01); *G06K 9/3216* (2013.01); *G06Q 10/20* (2013.01); *G09B 9/006* (2013.01); *G05B 2219/32014* (2013.01)

(58) Field of Classification Search

CPC ..... G06K 9/3216; G06K 9/00671; G06F 3/01; G06F 3/0304; G06Q 10/20; G09B 9/006; G01S 7/5206; G01S 7/52028; G01S 7/52044; G01N 29/06; G01H 3/125; G05B 2219/32014

See application file for complete search history.

(56) References Cited

U.S. PATENT DOCUMENTS 5,745,387 A * 4/1998 Corby, Jr. .............. B25J 9/1671 348/114
5,831,584 A * 11/1998 Socks ..................... G06F 3/011 345/158

(Continued)

FOREIGN PATENT DOCUMENTS

DE WO 03078112 A2 * 9/2003 ......... G05B 19/4183

OTHER PUBLICATIONS

Barb, Z.; Wearable Computers: New technology boosts productivity in aircraft maintenance, aviationpros.com; Apr. 1, 2004.

(Continued)

*Primary Examiner* — Mohammed Jebari
(74) *Attorney, Agent, or Firm* — Lorenz & Kopf, LLP

(57) ABSTRACT

A maintenance assistance system and method of operating are provided. The maintenance assistance system may include, but is not limited to, a camera, a speaker, a technician marker, a memory configured to store a location of a plurality of tags and a location of at least one component relative to at least one of the plurality of tags, and a processor communicatively coupled to the camera, the speaker and the memory, the processor configured to receive an indication of one of the components, determine a location of the technician marker relative to the location of the indicated component based upon data from the camera and the location of the indicated component relative to the at least one of the plurality of tags, and output position information to the speaker based upon the determined location of the technician marker relative to the location of the indicated component.

17 Claims, 4 Drawing Sheets

(56) References Cited

U.S. PATENT DOCUMENTS 5,844,824 A 12/1998 Newman et al.
6,006,126 A * 12/1999 Cosman ............... G06K 9/3216 600/414
6,636,249 B1 * 10/2003 Rekimoto ............... G06F 3/002 345/419
8,179,604 B1 * 5/2012 Prada Gomez .... G02B 27/0093 345/8
8,279,091 B1 * 10/2012 Tran ........................ G06F 3/014 340/4.1
8,301,368 B1 10/2012 Masson
2002/0024675 A1 * 2/2002 Foxlin .................. G02B 27/017 356/620
2002/0089544 A1 * 7/2002 Jahn ........................ G06F 3/011 715/778
2002/0122583 A1 9/2002 Thompson
2009/0187389 A1 7/2009 Dobbins et al.
2009/0237763 A1 * 9/2009 Kramer ................ G03H 1/0005 359/23
2010/0315329 A1 12/2010 Previc et al.
2010/0328451 A1 * 12/2010 Hotta ..................... G01B 11/03 348/135
2010/0332182 A1 * 12/2010 Yatsuda .................. G01S 5/163 702/152
2012/0120070 A1 * 5/2012 Baillot ............. G08B 13/19621 345/419
2012/0262558 A1 * 10/2012 Boger ................ G02B 27/0093 348/61
2012/0294509 A1 * 11/2012 Matsumoto .............. B25J 5/007 382/153
2013/0162835 A1 * 6/2013 Forland .................. H04N 5/332 348/164
2013/0335611 A1 * 12/2013 Roman .................. G06Q 99/00 348/333.01

OTHER PUBLICATIONS

EP Extended Search Report for Application No. 14191148.7 dated Dec. 19, 2014.
EP Examination Report for Application No. 14191148.7-1958 dated Nov. 3, 2016.

* cited by examiner

MAINTENANCE ASSISTANT SYSTEM

TECHNICAL FIELD

The present disclosure generally relates to maintenance systems, and more particularly relates to a system and method for assisting a technician in performing maintenance.

BACKGROUND

Maintenance personnel often need both hands to perform maintenance tasks. However, in complex systems maintenance personnel will often have to consult detailed drawings to identify and locate components and consult manuals to confirm the proper steps to perform the needed maintenance, increasing the difficulty in performing the maintenance task. Accordingly, systems and methods for assisting maintenance personnel in performing their duties are desirable.

BRIEF SUMMARY

In one embodiment, for example, a maintenance assistance system is provided. The maintenance assistance system may include, but is not limited to, a camera, a speaker, a technician marker, a memory configured to store a location of a each of a plurality of tags and a location of at least one component relative to at least one of the plurality of tags, and a processor communicatively coupled to the camera, the speaker and the memory, the processor configured to receive an indication of one of the components, determine a location of the technician marker relative to the location of the indicated component based upon data from the camera and the location of the indicated component relative to the location of at least one of the plurality of tags, and output position information to the speaker based upon the determined location of the technician marker relative to the location of the indicated component.

In another embodiment, a method for operating a maintenance assistance system comprising a camera, a technician marker, a speaker, a memory and a processor communicatively coupled to the camera, the speaker and the memory is provided. The method may include, but is not limited to receiving, by the processor, an indication of a component, determining, by the processor, a location of the technician marker relative to the location of the indicated component based upon data from the camera and a location of the indicated component relative to at least one tag stored in the memory, and outputting position information to the speaker based upon the determined location of the technician marker relative to the location of the indicated component.

In yet another embodiment, a computer-readable medium is provided. The computer-readable medium, which when executed by a processor, operate a maintenance assistance system comprising the processor, a camera, a technician marker, a speaker, and a memory, the instructions causing the processor to receive an indication of a component, determine a location of the technician marker relative to the location of the indicated component based upon data from the camera and a location of the indicated component relative to at least one tag stored in the memory; and, output position information to the speaker based upon the determined location of the technician marker relative to the location of the indicated component.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a maintenance assistance system is provided. The maintenance assistance system utilizes a system of tags which may be placed anywhere on a system which could require maintenance. By storing a location of the tags and the location of components which may require maintenance relative to the location of the tags, the maintenance assistance system provides a cheap and reliable way of assisting a technician in locating and identifying the components.

Figure 1:
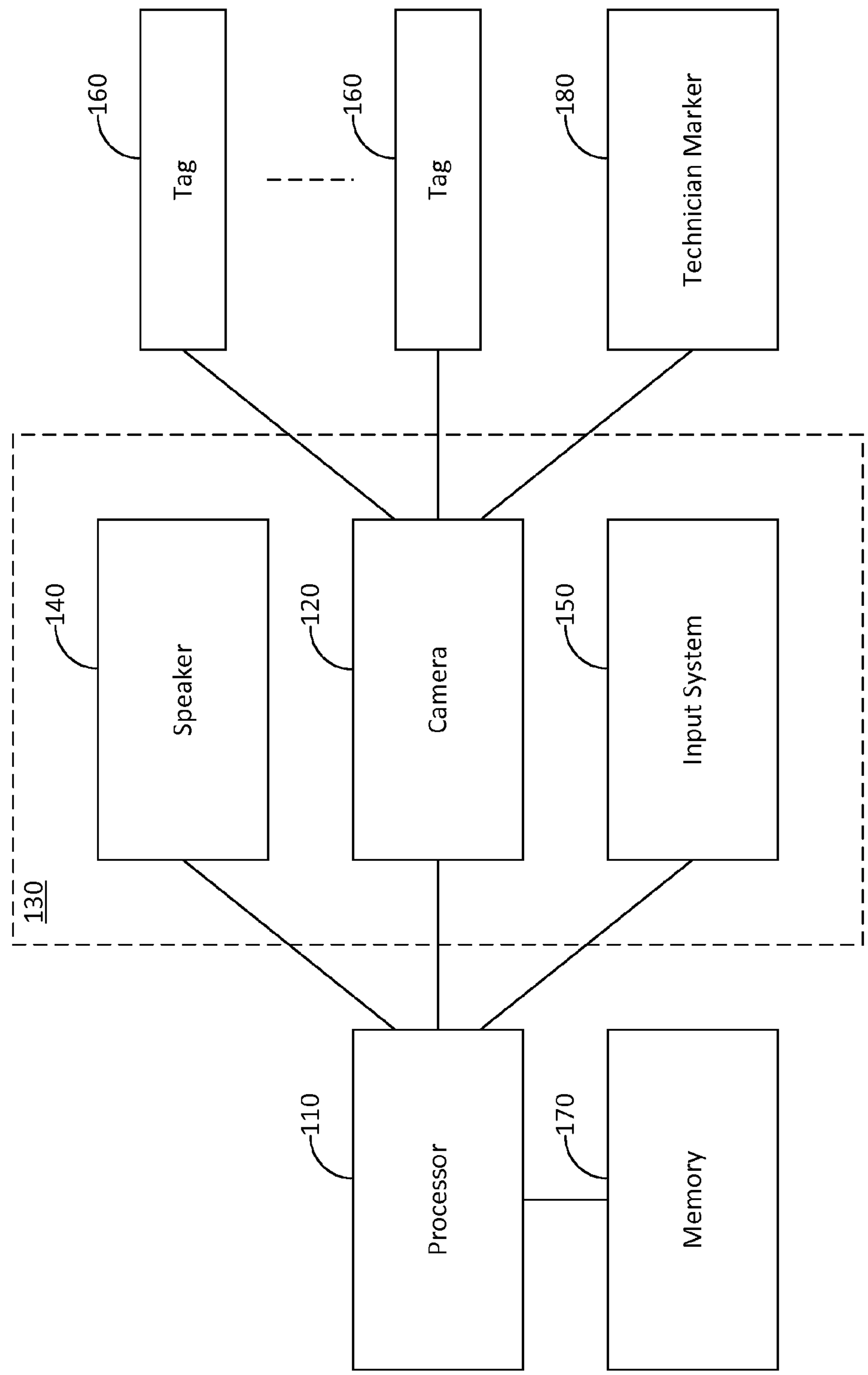
FIG. 1 is a block diagram of a maintenance assistance system, in accordance with an embodiment.

FIG. 1 is a block diagram of a maintenance assistance system 100, in accordance with an embodiment. The maintenance assistance system 100 includes a processor 110. The processor 110 may be a central processing unit (CPU), graphical processing unit (GPU), a physics processing unit (PPU), an application specific integrated circuit (ASIC), a microprocessor, an field programmable logic array, or any other logic circuit or combination thereof. In one embodiment, for example, the processor 110 may be housed in a technician wearable system, such as in a belt or bag which the technician could wear. In this embodiment, for example, the processor may be coupled to the other components of the maintenance assistance system 100 via a wire, a wireless system, or any combination thereof. The wireless system, for example, may be a Bluetooth system, a Zigbee system, a cellular system, a WiFi system, or any other type of communication system, or combination thereof. In another embodiment, for example, the processor 110 may be located remotely from the technician. In this embodiment, for example, the processor 110 may be in a server or other general purpose computer and may communicate with the other components of the maintenance assistance system 100 via one or more of the wireless systems.

The maintenance assistance system 100 further includes a camera 120. In one embodiment, for example, the camera 120 may incorporated into or mounted on safety glasses 130. The camera 120 may be a video camera, a still image camera or may be capable of taking both video and pictures. As discussed in further detail below, the processor 110 analyzes data from the camera to detect objects in the environment to aid the technician in a maintenance task.

The maintenance assistance system 100 further includes a speaker 140. In one embodiment, for example, the speaker 140 may incorporated into or mounted on the safety glasses 130. The speaker 140 may be an in-ear headphone system, an over the ear headphone system or a broadcast speaker. As discussed in further detail below, the processor 110 outputs instructions and directions via the speaker 140 to aid the technician in a maintenance task.

The maintenance assistance system 100 further includes an input system 150. While the camera 120 is illustrated separately from the input system 150, the camera 120 may be part of the input system. In one embodiment, for example, the camera 120 may capture user input such as swipe gestures, pinch gestures, expand or contract gestures, selection gestures or any other gesture which may be recognizable by the processor 110. In another embodiment, for example, the input system 150 may a microphone. In this embodiment, a technician may interact with the maintenance assistance system 100 by speaking into the microphone. The processor 110 would then analyze the speech and output a response to aid the technician in a maintenance task, as discussed in further detail below. In this embodiment, for example, the input system 150 may be incorporated into or mounted on the safety glasses 130. In other embodiments, for example, the input system 150 may be a keyboard. The keyboard may be a physical keyboard or a virtual keyboard. An image of a keyboard, for example, may be overlaid onto a surface by a heads up display incorporated into the safety glasses 130. The processor 110, via the data captured by the camera 140, can then capture user input. Further, any combination of input systems 150 may be used.

In other embodiments, for example, the camera 120, speaker 140 and input system 150 could be mounted on a safety hat, such as a hard hat (not illustrated). In another embodiment, for example, an over the ear style system may be used which incorporates the camera 120, speaker 140 and any input system 150 into a single electronic device. In another embodiment, for example, the camera 120, speaker and any other input system 150 may be incorporated into a headband. Further, one of ordinary skill would recognize that the camera 120, speaker 140 and input system 150 could be mounted in a variety of other ways.

The maintenance assistance system 100 further includes multiple tags 160. As discussed in further detail below, the tags 160 are used by the maintenance assistance system 100 to help a technician locate a component to work on. The tags 160 may be placed on or around components the technician will be working on. The tags may have one or more predetermined colors, one or more predetermined shapes, one or more predetermined images, they may be numbered, include bar codes, or any other identifiable marking or combination thereof. Further, the tags may be readable in infrared light or ultraviolet light. While the tags may also be visible in the human visibility spectrum, the tags may also be designed to reflect infrared or ultraviolet light which may improve contrast, and thus readability, by the camera 120 and processor 110. Further, tags 160 designed for infrared and ultraviolet light may degrade slower in certain host environments. In some instances component of the system the technician is working on themselves may be tags 160. For example, a position of each component may be stored relative to lights, buttons, handles, levers, or any other identifiable components on the system.

The location of each tag 160 is stored in a memory 170. Any reference system may be used. In one embodiment, for example, the reference system may be a Latitude/Longitude/Altitude reference system for large systems, such as processing plants or other immobile components. In smaller systems a zero datum reference system could be used. Inside a maintenance bay of a ship, for example, may be better suited to a reference datum. The tip of the bow may be defined as (0,0,0) and the locations of the other components may be are measured and stored relative thereto. Units could be feet, inches, cm, mm, um or any other appropriate scale for the system. Each tag 160 would have a coordinate (x, y, z) and each component would have a coordinate. By mapping the visual data as a plane, the coordinate can be transformed onto that visual plane and supplied to the technician as left/right, up/down, and forward/backward.

The memory 170 may be any non-transitory computer-readable memory. In one embodiment, for example, the memory 170 may be housed in a technician wearable system, such as in a belt or bag which the technician could wear. In another embodiment, for example, the memory 170 may be located remote from the technician. In this embodiment, for example, the processor 110 may be communicatively coupled to the memory 170 via a wireless communication system, as discussed above. The memory 170 may also store the location of components to be serviced and instructions for servicing the components. The location of the components may be stored relative to one or more tags 160 on the system. If at least two tags 160 are on the system, the processor may be able to triangulate a position of the components, as discussed in further detail below. Alternatively, if the tags 160 are large enough, the processor 110 may be able triangulate a position of the components based upon a single tag 160 by measuring its size and orientation to determine the plane between the tag 160 and the component relative to the visual plane. The location of the components may also be saved relative to other identifiable elements of the system. For example, if a component is on a shelf, a row, a column, near large or other obvious components, or the like, the location of the component relative to the other component can be stored in the memory 170. The overall position, for example, on the top, lower right, upper left, etc., of the component may also be stored. In one embodiment, for example, the memory 170 may also store maintenance procedures, as discussed in further detail below. Further, the memory 170 may store instructions, which when executed by the processor 110, implement a method for operating the maintenance assistance system 100, as discussed in further detail below.

Figure 2:
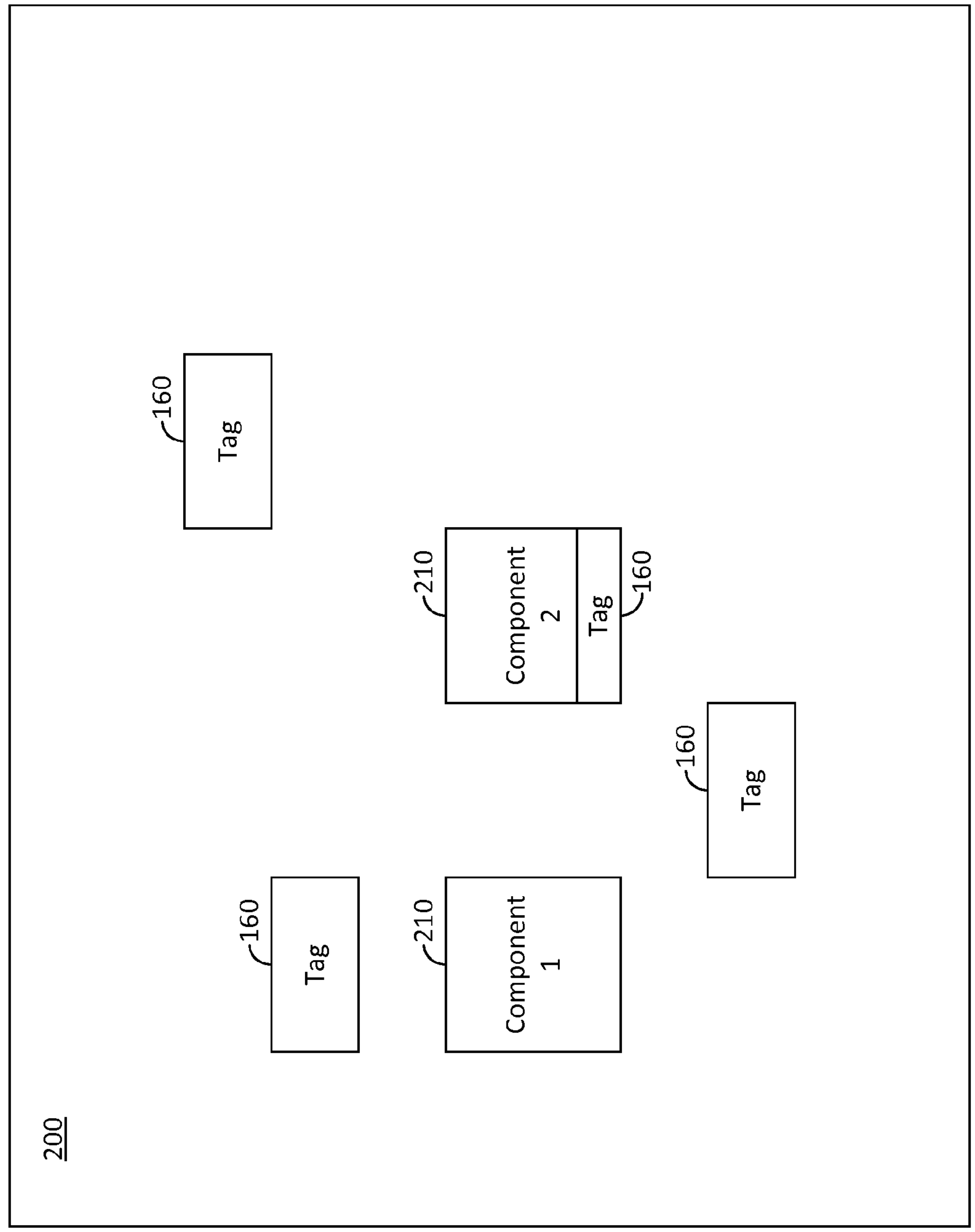
FIG. 2 is a block diagram of a system requiring maintenance, in accordance with an embodiment.

FIG. 2 is a block diagram of a system 200 requiring maintenance, in accordance with an embodiment. The system 200 could be any industrial system, commercial system, vehicle (e.g., aircraft, watercraft, spacecraft, train, car, truck, etc.) computer system or any other system which a maintenance technician may need to service. The system 200 includes multiple components 210 which may require servicing. As discussed above, multiple tags 160 may be placed around the system or on a component 210 itself. In one embodiment, for example, relative or absolute coordinates of the components 210 and tags 160 may be stored, thereby allowing the maintenance assistance system 100 to locate the components 210, as discussed in further detail below. In another embodiment, for example, a distance from each tag 160 to each component 210 as well as an angle there between may be stored in the memory.

Figure 3:
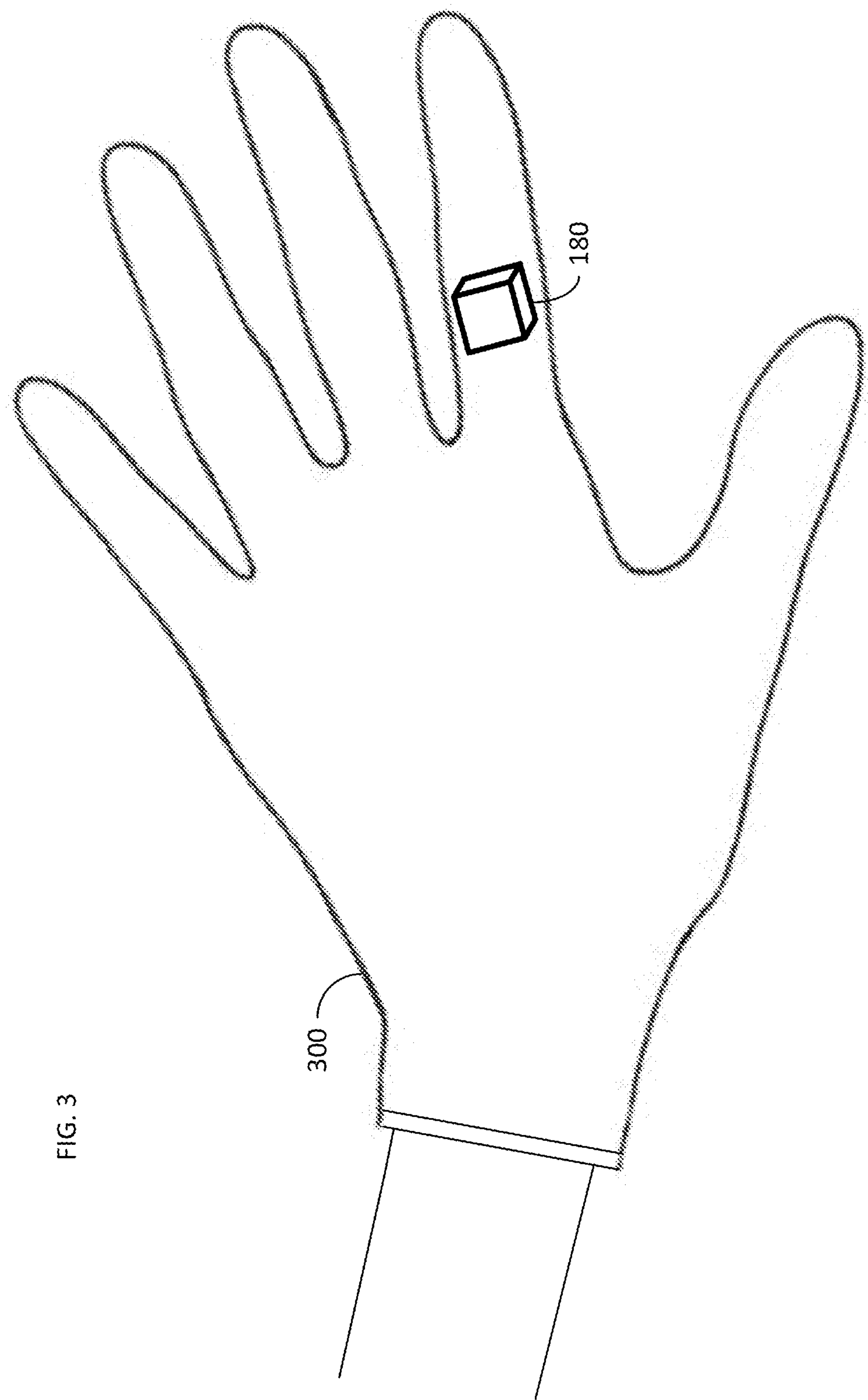
FIG. 3 illustrates a glove in accordance with the embodiment.

Returning to FIG. 1, the maintenance assistance system 100 further includes a technician marker 180. In one embodiment, for example, the technician marker 180 may be on a glove. However, in other embodiments, for example, the tag may be located on a wrist or forearm. FIG. 3 illustrates a glove 300 in accordance with the embodiment.

The glove 300 includes a multidimensional technician marker 180. The technician marker 180 may be arranged anywhere along the surface of the glove 300, but is preferably on the back of the glove 300 so as to not interfere with the technicians hands and is more likely to be visible to the camera 120. In one embodiment, for example, the technician marker 180 may be a three-dimensional object, such as a cube or a sphere. However, the technician marker 180 may be any regular or irregular multidimensional shape. While the technician marker 180 could be a two dimensional shape, the technician marker 180 is preferably a three dimensional shape as the camera 120 is more likely to be able to capture an image of the marker 180 when the glove is moved. For example, if the technician's hand is perpendicular to the camera 120, the camera may have difficulty capturing an image of the technician marker 180 if the technician marker 180 is only two dimensional. As discussed in further detail below, the processor 110 may compare a location of the technician marker 180 to the location of the component the technician will be working on the verify that the technician is working on the correct component. In one embodiment, for example, the technician marker 180 may be a different color than the glove 300 or may be designed to reflect infrared or ultraviolet light, to aid the processor in detecting the technician marker 180 from the camera data.

Figure 4:
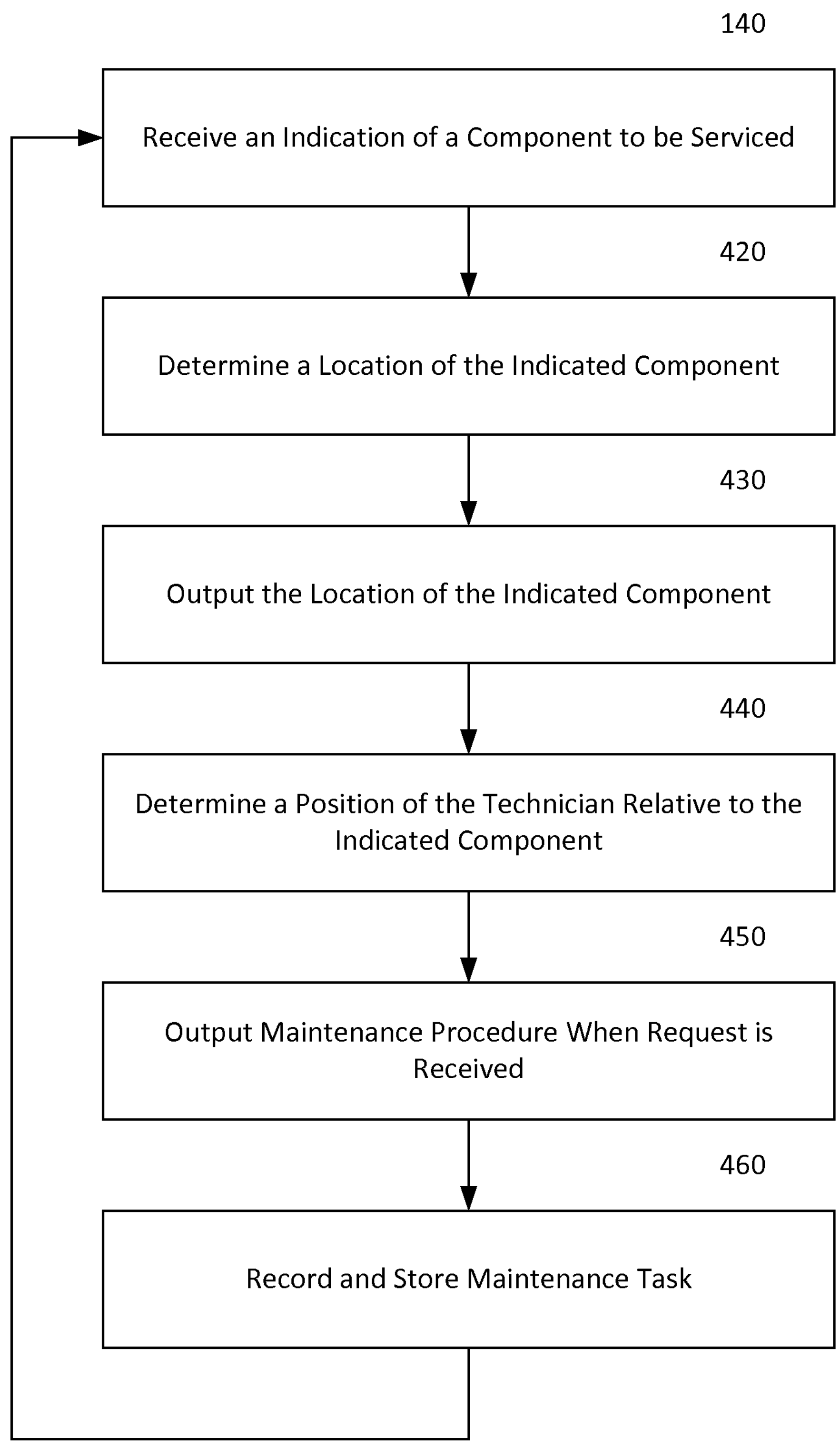
FIG. 4 is a flow diagram illustrating an exemplary method for operating a maintenance assistance system, in accordance with an embodiment.

FIG. 4 is a flow diagram illustrating an exemplary method 400 for operating a maintenance assistance system, in accordance with an embodiment. A processor, such as the processor 110 illustrated in FIG. 1, first receives an indication of a component to be serviced. (Step 410). In one embodiment, for example, the technician may speak the name of the component. In this embodiment, for example, a microphone may capture the speech and transmit the captured speech data to the processor. The processor may then analyze the speech data and determine which component the technician is attempting to locate. In another embodiment, for example, the indication may be received via a keyboard, from any other input system, or electronically from a work order.

The processor then determines a location of the indicated component. (Step 420). The location of the indicated component is stored in a memory, such as the memory 170 illustrated in FIG. 1. The location may be stored according to a coordinate system, as discussed above, or at a position and angle relative to one or tags on the respective system. The processor, based upon the location data stored in the system, then determines the location of the indicated component. The memory may also store other positional information. For example, if the indicated component is in a row of components, the memory may store the position (e.g., third from the right in the third row) relative to other components on the system. Likewise, if the component is near a more recognizable component, the memory may store position information relative to other components (e.g., the component is below the big red button).

The processor then outputs the location of the indicated component. (Step 430). In one embodiment, for example, the processor may output whatever relative positional information is stored in the memory to the speaker. As discussed above, some components may be conducive to having tags placed thereon or may be independently recognizable, effectively becoming a tag. In this embodiment, for example, the processor may output a tag number corresponding to the location of the indicated component to the speaker.

In one embodiment, for example, the processor may also determine a position of the technician relative to the component. (Step 440). The processor may perform the determination automatically. In this embodiment, the processor may monitor data from the camera to determine where a current position of the technician marker on the glove or other technician work item is relative to the indicated component. If the technician is moving towards the wrong component, the processor may output position information such as further instructions to the speaker, for example, "left one unit," if the marker on the glove is right of the indicated component. The processor may also automatically output position information such as a positive response if the marker is proximate to the indicated component. Alternatively, the technician may manually start the determination if the technician is unsure if the correct component has been identified. The technician could, for example, request that the processor verify the location of the indicated component to the technician marker via any of the input systems.

As discussed above, the processor may use triangulation to verify the position of the technician relative to the component. The processor first determines a position of the indicated component via triangulation by locating one or more tags on the system via the camera data. The processor then, based upon known angles and distances from the tags to the indicated component stored in the memory, or calculated angles and distances based upon the coordinates stored in the memory, can determine a location of the indicated component. The processor than compares the location of the component to the technician marker. In one embodiment, for example, the processor may first compute a relative location between the tag(s) and a component and between the technician marker and the component. The processor may then compute a visual plane by triangulation of the visible tag(s) and then transform the relative data onto the visual plane using a rotational and scaling transform. Once on the visual plane, the processor can convert the differences between the technician marker 180 and the component into directions. If the location of the technician marker is within a predetermined distance of the indicated component, the processor may output a positive match.

In one embodiment, for example, the technician may request assistance on a procedure regarding the indicated component. (Step 450). In this embodiment, for example, a procedure for performing maintenance on a component may be stored in the memory. The processor may access the data corresponding to the maintenance procedure are output instructions to the technician via the speaker or any other output device. The instructions may include checkpoints wherein the processor may wait for a response from the user, for example, indicating that the task is complete or to repeat the instructions, before the processor outputs the next instruction in the maintenance procedure.

Furthermore, in one embodiment, for example, the camera may record the technician performing the maintenance procedure and store the data in the memory. (Step 460). The video and/or images of the technician may be viewed for quality assurance purposes and/or to verify that a scheduled task was completed by the technician. The technician may also create a record of the maintenance. The record could include readings from instruments, voice recording or a transcription of the voice to a digital data set.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A maintenance assistance system, comprising:
   a camera;
   a speaker;
   a wearable technician marker;
   a memory configured to store a location of each of a plurality of tags and a location of at least one serviceable component relative to at least one of the plurality of tags; and
   a processor communicatively coupled to the camera, the speaker and the memory, the processor configured to:
      receive an indication of a component to be serviced from the at least one serviceable components;
      determine a location of the indicated component to be serviced relative to the locations of at least one of the plurality of tags stored in the memory based upon a distance of the indicated component to be serviced from the at least one of the plurality of tags and an angle between the indicated component to be serviced and the at least one of the plurality of tags;
      determine a location of the wearable technician marker relative to the determined location of the indicated component to be serviced based upon data from the camera including a distance of the wearable technician marker from the indicated component to be serviced and an angle between the wearable technician marker and the indicated component to be serviced; and
      output position information comprising an instruction to locate the indicated component to be serviced relative to the wearable technician marker to the speaker based upon the determined location of the wearable technician marker relative to the location of the indicated component to be serviced.

2. The maintenance assistance system of claim 1, wherein the position information includes an affirmation that the wearable technician marker is within a predetermined distance of the indicated component to be serviced.

3. The maintenance assistance system of claim 1, wherein the wearable technician marker is on a glove.

4. The maintenance assistance system of claim 1, wherein the processor is further configured to determine a location of the wearable technician marker relative to the location of the indicated component to be serviced by:
   determining the location of the indicated component to be serviced relative to at least one of the plurality of tags via triangulation; and
   comparing the determined location of the indicated component to be serviced to a position of the wearable technician marker.

5. The maintenance assistance system of claim 1, wherein the processor is further configured to output the location of the indicated component to be serviced to the speaker based upon the location of the indicated component to be serviced stored in the memory.

6. The maintenance assistance system of claim 1, wherein the processor is further configured to:
   receive a request for a maintenance procedure from an input system; and
   output instructions for the maintenance procedure to the speaker.

7. The maintenance assistance system of claim 6, wherein the processor is further configured to store data from at least one of the camera and the input system corresponding to an execution of the maintenance procedure in the memory.

8. A method for operating a maintenance assistance system comprising a camera, a wearable technician marker, a speaker, a memory and a processor communicatively coupled to the camera, the speaker and the memory, the method comprising:
   receiving, by the processor, an indication of a component to be serviced;
   determining, by the processor, a location of the indicated component to be serviced relative to the locations of at least one of the plurality of tags stored in the memory based upon a distance of the indicated component to be serviced from the at least one of the plurality of tags and an angle between the indicated component to be serviced and the at least one of the plurality of tags;
   determining, by the processor, a location of the wearable technician marker relative to the location of the indicated component to be serviced based upon data from the camera including a distance of the wearable technician marker from the indicated component to be serviced and an angle between the wearable technician marker and the indicated component to be serviced and a location of the indicated component relative to at least one tag stored in the memory; and
   outputting position information comprising instructions to locate the indicated component to be serviced relative to the wearable technician marker to the speaker based upon the determined location of the wearable technician marker relative to the location of the indicated component to be serviced.

9. The method of claim 8, wherein the determining further comprises:
   determining, by the processor, the location of the indicated component to be serviced relative to the at least one tag via triangulation; and
   comparing, by the processor, the determined location of the indicated component to be serviced to a position of the wearable technician marker.

10. The method of claim 8, further comprising outputting, by the processor, the location of the indicated component to be serviced to the speaker based upon a location of the indicated component to be serviced stored in the memory.

11. The method of claim 8, further comprising:
   receiving, by the processor, a request for maintenance procedure instructions; and
   outputting, by the processor, the maintenance procedure instructions to the speaker.

12. The method of claim 8, further comprising:
   recording, by the camera, a technician executing a maintenance procedure; and
   storing the recording in the memory.

13. A non-transitory computer-readable medium storing instructions, which when executed by a processor, operate a maintenance assistance system comprising the processor, a camera, a wearable technician marker, a speaker, and a memory, the instructions causing the processor to:
   receive an indication of a component to be serviced;
   determine a location of the indicated component to be serviced relative to the locations of at least one of the plurality of tags stored in the memory based upon a distance of the indicated component to be serviced from the at least one of the plurality of tags and an angle between the indicated component to be serviced and the at least one of the plurality of tags;

determine a location of the wearable technician marker relative to the location of the indicated component to be serviced based upon data from the camera including a distance of the wearable technician marker from the indicated component to be serviced and an angle between the wearable technician marker and the indicated component to be serviced and a location of the indicated component relative to at least one tag stored in the memory; and output position information comprising instructions to locate the indicated component to be serviced relative to the wearable technician marker to the speaker based upon the determined location of the wearable technician marker relative to the location of the indicated component to be serviced.

14. The non-transitory computer-readable medium of claim 13 wherein the instructions further cause the processor to:

determine the location of the indicated component to be serviced relative to the at least one tag via triangulation; and compare the determined location of the indicated component to be serviced to a position of the wearable technician marker.

15. The non-transitory computer-readable medium of claim 13 wherein the instructions further cause the processor to output the location of the indicated component to be serviced to the speaker based upon a location of the indicated component to be serviced stored in the memory.

16. The non-transitory computer-readable medium of claim 13 wherein the instructions further cause the processor to:

receive a request for maintenance procedure instructions; and output the maintenance procedure instructions to the speaker.

17. The non-transitory computer-readable medium of claim 16 wherein the instructions further cause the processor to record a technician executing a maintenance procedure via the camera; and store the recording in the memory.

* * * * *